(12) United States Patent
Urushihara et al.

(10) Patent No.: US 9,450,525 B2
(45) Date of Patent: Sep. 20, 2016

(54) ELECTRIC MOTOR CONTROL SYSTEM

(71) Applicant: HONDA MOTOR CO., LTD., Tokyo (JP)

(72) Inventors: Keisuke Urushihara, Wako (JP); Masayuki Arai, Wako (JP); Keigo Andoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/723,459

(22) Filed: May 28, 2015

(65) Prior Publication Data
US 2015/0372624 A1 Dec. 24, 2015

(30) Foreign Application Priority Data
Jun. 19, 2014 (JP) .................................. 2014-126533

(51) Int. Cl.
G05D 23/00 (2006.01)
H02P 6/14 (2016.01)

(52) U.S. Cl.
CPC ...................................... H02P 6/14 (2013.01)

(58) Field of Classification Search
CPC ........ H02P 27/04; H02P 23/00; H02P 25/00; H02P 27/00; H02P 1/00; H02P 3/00; G05B 5/00; G05D 23/00; H02H 7/08
USPC ................. 318/139, 400.01, 400.02, 400.07, 318/400.14, 400.15, 700, 701, 721, 779, 318/799, 800, 801, 471, 472; 363/40, 363/56.01, 55, 71, 74, 95, 109, 131
See application file for complete search history.

(56) References Cited

U.S. PATENT DOCUMENTS

| 7,755,313 | B2 * | 7/2010 | Son | B60L 3/06 318/432 |
| 7,952,236 | B2 * | 5/2011 | Mitsutani | B60L 3/12 307/10.1 |
| 8,220,574 | B2 * | 7/2012 | Nozawa | H02M 7/53873 180/65.21 |

FOREIGN PATENT DOCUMENTS

| JP | 2007-143293 | 6/2007 |
| JP | 2008-167616 | 7/2008 |

* cited by examiner

Primary Examiner — Antony M Paul
(74) Attorney, Agent, or Firm — Mori & Ward, LLP

(57) ABSTRACT

An electric motor control system includes an inverter, an element temperature observation data acquiring device, a rotational speed upper limit setting device, and a rotational speed limiter. The inverter includes switching elements. The element temperature observation data acquiring device is configured to acquire element temperature observation data indicating an observation value of a temperature of the switching elements of the inverter. The rotational speed upper limit setting device is configured to set a rotational speed upper limit of an electric motor in accordance with the observation value of the temperature of the switching elements so as to satisfy a first condition that a voltage applicable to the switching elements in a case where the electric motor is operated at the rotational speed upper limit is lower than or equal to a withstand voltage of the switching elements.

16 Claims, 7 Drawing Sheets

ELECTRIC MOTOR CONTROL SYSTEM

CROSS-REFERENCE TO RELATED APPLICATIONS

The present application claims priority under 35 U.S.C. §119 to Japanese Patent Application No. 2014-126533, filed Jun. 19, 2014, entitled "Electric Motor Control System." The contents of this application are incorporated herein by reference in their entirety.

BACKGROUND

1. Field

The present disclosure relates to an electric motor control system.

2. Description of the Related Art

In general, control systems that control an electric motor mounted in a hybrid vehicle or an electric vehicle include an inverter disposed between a direct current (DC) power source and the electric motor.

As is widely known, the inverter includes a plurality of switching elements each formed from a semiconductor switching element, such as a transistor. By performing on/off control on each of the switching elements of the inverter, DC power input from the DC power source to the inverter is converted into an alternating current (AC) power, which is supplied to the electric motor. Alternatively, power (AC power) generated and output by a regenerative operation performed by the electric motor is converted into DC power and is charged into an electricity storage device (e.g., a secondary battery) disposed on the DC power source side.

In addition, as described in, for example, Japanese Unexamined Patent Application Publication Nos. 2007-143293 and 2008-167616, among control systems of such a type, some systems have a protection function for protecting the switching elements of the inverter from an applied voltage that exceeds the withstand voltage of the switching elements.

Japanese Unexamined Patent Application Publication Nos. 2007-143293 and 2008-167616 describe a technique for variably controlling a power source voltage input to the inverter using a converter in accordance with a detected temperature of the switching elements while taking into account that the withstanding voltage of the switching elements decreases with decreasing temperature of the switching elements.

SUMMARY

According to one aspect of the present invention, an electric motor control system includes an inverter, an element temperature observation data acquiring unit, a rotational speed upper limit setting unit, and a rotational speed limiting unit. The inverter includes a plurality of switching elements. Electric power is distributed between a DC power source and an electric motor via the inverter. The element temperature observation data acquiring unit acquires element temperature observation data indicating an observation value of a temperature of the switching elements of the inverter. The rotational speed upper limit setting unit sets a rotational speed upper limit of the electric motor in accordance with the observation value of the temperature indicated by the element temperature observation data. The rotational speed limiting unit controls the rotational speed of the electric motor so that an actual rotational speed of the electric motor is lower than or equal to the rotational speed upper limit. The rotational speed upper limit setting unit sets the rotational speed upper limit in accordance with the observation value of a temperature indicated by the element temperature observation data so as to satisfy a first condition that a voltage applicable to the switching elements when the electric motor is operated at the rotational speed upper limit is lower than or equal to a withstand voltage of the switching elements. The withstand voltage is determined in accordance with the observation value of a temperature indicated by the element temperature observation data on the basis of a predetermined relationship between the withstand voltage and a temperature of the switching elements, indicating that the withstand voltage increases with increasing temperature of the switching elements.

According to another aspect of the present invention, an electric motor control system includes an inverter, an element temperature observation data acquiring unit, a power generation output upper limit setting unit, and a power generation output limiting unit. The inverter includes a plurality of switching elements. Electric power is distributed between a DC power source and an electric motor via the inverter. The element temperature observation data acquiring unit acquires element temperature observation data indicating an observation value of a temperature of the switching elements of the inverter. The power generation output upper limit setting unit sets a power generation output upper limit during a regenerative operation performed by the electric motor in accordance with the observation value of the temperature indicated by the element temperature observation data. The power generation output limiting unit controls the power generation output of the electric motor so that an actual power generation output during the regenerative operation performed by the electric motor is lower than or equal to the power generation output upper limit. The power generation output upper limit setting unit sets the power generation output upper limit in accordance with the observation value of the temperature indicated by the element temperature observation data so as to satisfy, when each of the switching elements of the inverter is subjected to on/off control to cause the electric motor to perform a generative operation at the power generation output upper limit, a condition that a voltage applicable to the switching elements is lower than or equal to a withstand voltage of the switching elements. The withstand voltage is determined in accordance with the observation value of a temperature indicated by the element temperature observation data on the basis of a predetermined relationship between the withstand voltage and a temperature of the switching elements, indicating that the withstand voltage increases with increasing temperature of the switching elements.

According to further aspect of the present invention, an electric motor control system includes an inverter, an element temperature observation data acquiring device, a rotational speed upper limit setting device, and a rotational speed limiter. The inverter includes switching elements. Electric power is to be distributed between a DC power source and an electric motor via the inverter. The element temperature observation data acquiring device is configured to acquire element temperature observation data indicating an observation value of a temperature of the switching elements of the inverter. The rotational speed upper limit setting device is configured to set a rotational speed upper limit of the electric motor in accordance with the observation value of the temperature of the switching elements so as to satisfy a first condition that a voltage applicable to the switching elements in a case where the electric motor is operated at the rotational speed upper limit is lower than or equal to a withstand voltage of the switching elements. The withstand voltage is determined in accordance with the observation value of the temperature of the switching elements based on a predetermined relationship between the withstand voltage and a temperature of the switching elements indicating that the withstand voltage increases as the temperature of the switching elements increases. The rotational speed limiter is configured to control the electric motor so that a rotational speed of the electric motor is lower than or equal to the rotational speed upper limit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
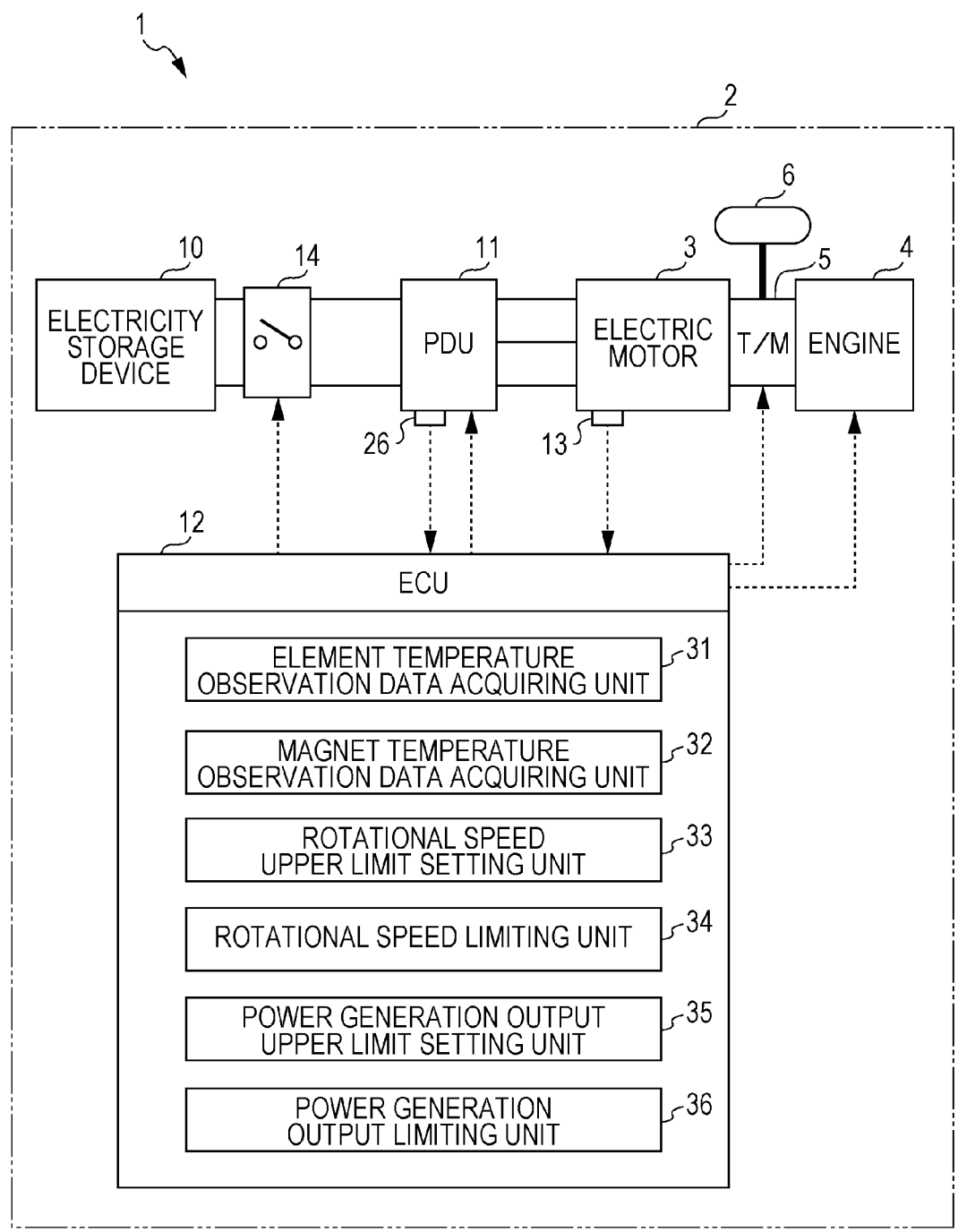
FIG. 1 is a block diagram of the configuration of an electric motor control system according to an exemplary embodiment of the present disclosure.

The embodiments will now be described with reference to the accompanying drawings, wherein like reference numerals designate corresponding or identical elements throughout the various drawings.

An exemplary embodiment of the present disclosure is described below with reference to FIGS. 1 to 9.

As illustrated in FIG. 1, an electric motor control system 1 according to the present exemplary embodiment is mounted in a hybrid vehicle 2 (hereinafter simply referred to as a "vehicle 2") including an electric motor 3 and an engine 4 (an internal-combustion engine) that serve as a power source for vehicle propulsion.

The output shaft of each of the electric motor 3 and the engine 4 is connected to a transmission 5 serving as a power transmission mechanism. Thus, the drive power is transferred to drive wheels 6 of the vehicle 2 via the transmission 5. Note that only one of the drive wheels 6 of the vehicle 2 is representatively illustrated in FIG. 1.

The electric motor control system 1 includes an electricity storage device 10 serving as a DC power source, a power drive unit 11 (hereinafter simply referred to as a "PDU 11") that delivers electric power between the electricity storage device 10 and the electric motor 3 (from the electricity storage device 10 to the electric motor 3 and vice versa), and a vehicle control unit 12 (hereinafter simply referred to as an "ECU 12") that controls driving of the vehicle 2.

The electric motor 3 is formed as, for example, a three-phase DC brushless motor. The electric motor 3 can selectively operate in a power running mode so as to generate the drive power (a drive torque) using the electric power supplied from the electricity storage device 10 and in a regenerative operating mode so as to generate electricity to be charged into the electricity storage device 10 using the drive power transferred from the drive wheel 6 during deceleration of the vehicle 2 or the drive power transferred from the engine 4.

In addition, the electric motor 3 has a mechanism (not illustrated) to supply lubricant oil to the electric motor 3 and a temperature sensor 13 that detects the temperature of the lubricant oil (hereinafter referred to as an "electric motor lubricant oil temperature").

According to the present exemplary embodiment, the detection value of the electric motor lubricant oil temperature output from the temperature sensor 13 has a certain correlation with the temperature of a magnet (a permanent magnet) (not illustrated) mounted in a rotor of the electric motor 3. Thus, the actual temperature of the magnet can be determined by the detection value of the electric motor lubricant oil temperature. Accordingly, the detection value of the electric motor lubricant oil temperature output from the temperature sensor 13 is used as magnet temperature observation data indicating an observation value of the temperature of the magnet.

Note that as the magnet temperature observation data, a detection value output from an appropriate sensor that directly detects the temperature of the magnet or a value estimated using an appropriate model and a detection value of the temperature of another portion of the electric motor 3 may be employed.

The electricity storage device 10 is formed from one of a secondary battery and a capacitor or the both.

Figure 2:
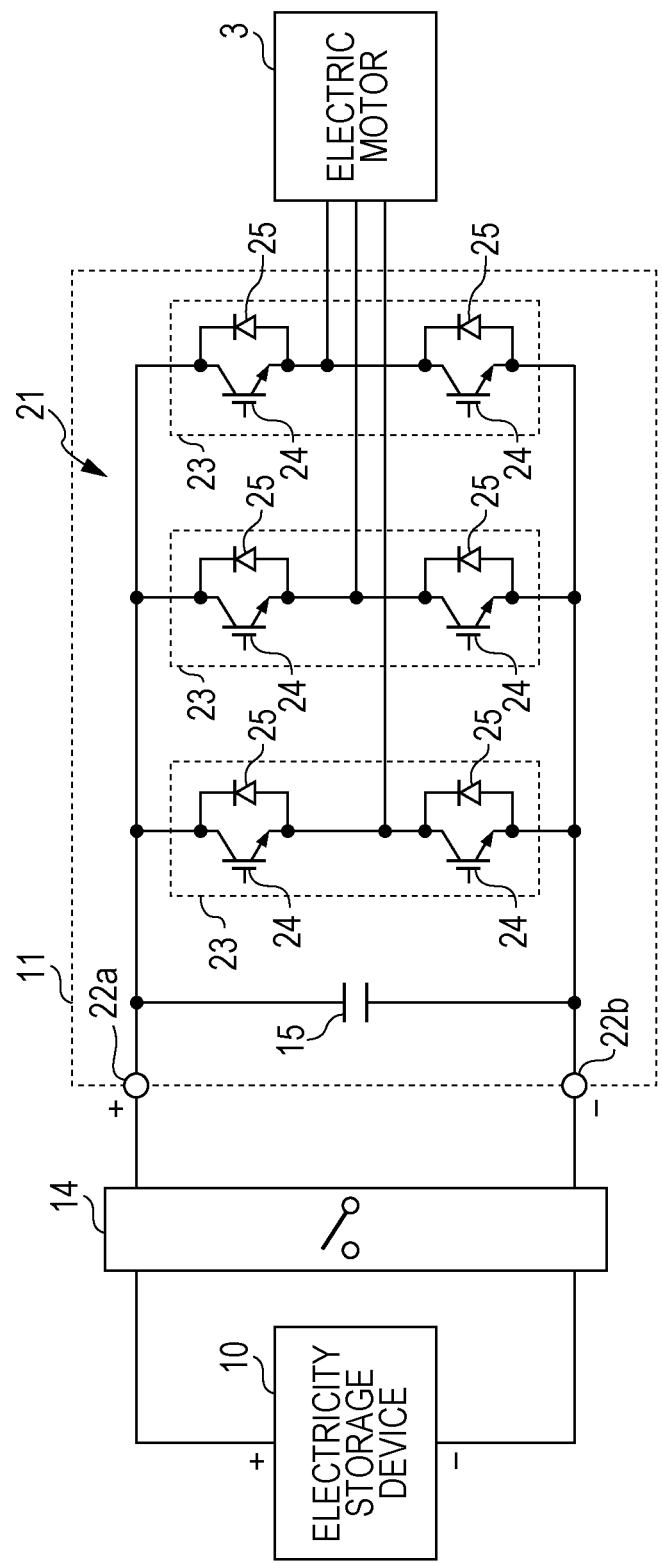
FIG. 2 illustrates a circuit configuration of an inverter included in the electric motor control system according to the exemplary embodiment.
Figure 3:
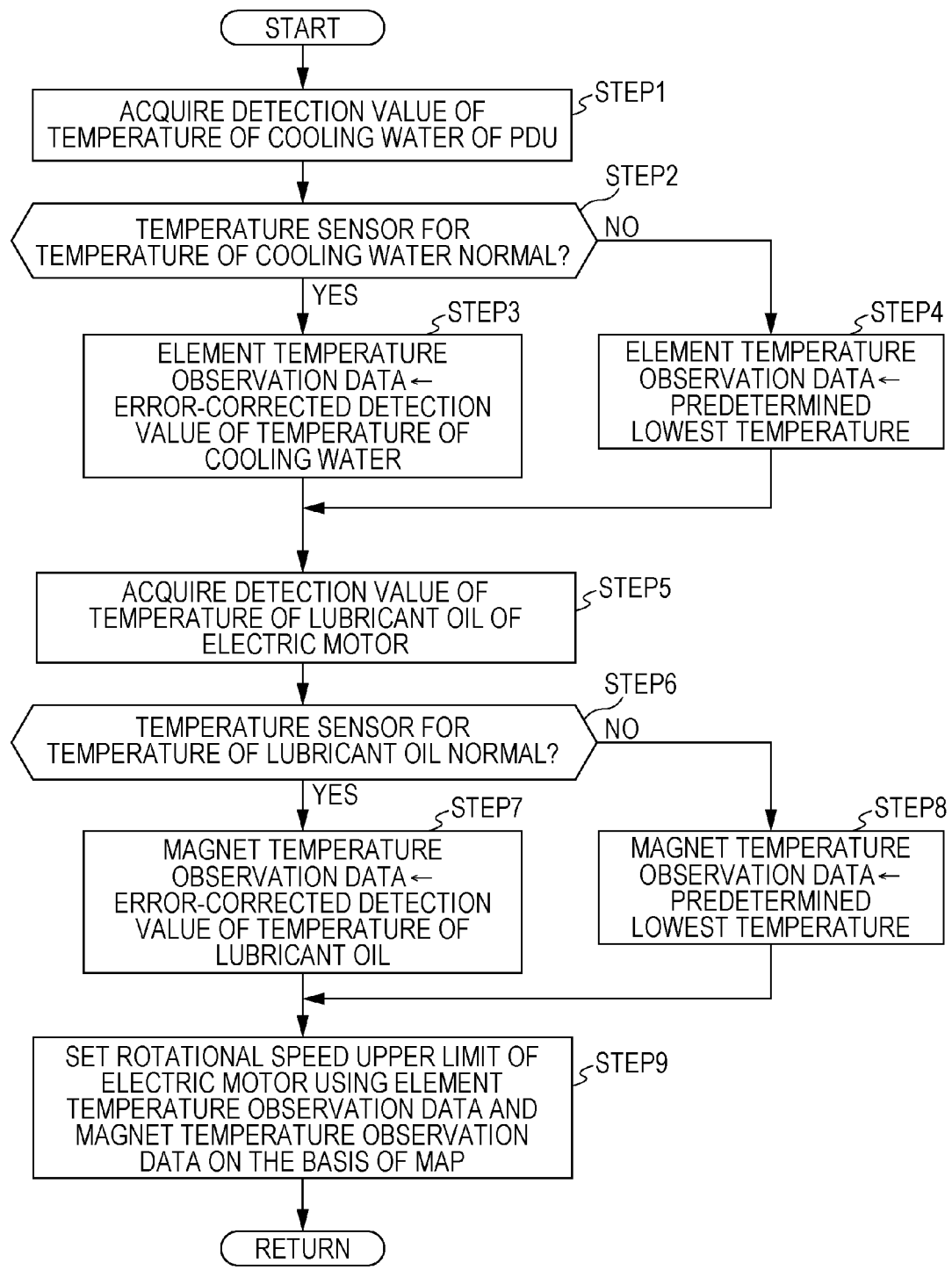
FIG. 3 is a flowchart of a process for setting a rotational speed upper limit of an electric motor according to the exemplary embodiment.

As illustrated in FIG. 2, the PDU 11 includes an inverter 21. The inverter 21 includes a plurality of switching elements 24 each formed from a semiconductor switching element, such as an insulated gate bipolar transistor (IGBT). The inverter 21 further includes a pair consisting of power source terminals 22a and 22b and three arms 23, 23, and 23 corresponding to the phases (a U phase, a V phase, and a W phase) of the electric motor 3. The arms 23, 23, and 23 are connected in parallel between the power source terminals 22a and 22b.

The power source terminals 22a and 22b are connected to the electricity storage device 10 via a contactor 14. When the contactor 14 is turned on, a DC voltage is applied from the electricity storage device 10 to the power source terminals 22a and 22b. Note that a DC/DC converter may be disposed between the contactor 14 and the pair consisting of the power source terminals 22a and 22b of the inverter 21.

In addition, a smoothing capacitor 15 that smoothes the voltage between the power source terminals 22a and 22b of the inverter 21 is disposed parallel to the arms 23, 23, and 23 between the power source terminals 22a and 22b.

Each of the arms 23, 23, and 23 is formed from two switching elements 24 and 24 connected in series and two diodes 25 and 25 connected in parallel to the switching elements 24 and 24, respectively. In addition, the middle point of each of the arms 23, 23, and 23 is connected to one of stator coils (not illustrated) corresponding to each phase of the electric motor 3.

In addition, the PDU 11 has a cooling mechanism of a water-cooling type (not illustrated) and a temperature sensor 26 (refer to FIG. 1) attached thereto. The temperature sensor 26 detects the temperature of the cooling water of the cooling mechanism (hereinafter referred to as a "PDU cooling water temperature").

According to the present exemplary embodiment, the detection value of the PDU cooling water temperature output from the temperature sensor 26 has a certain correlation with the temperature of the switching elements 24 of the inverter 21. Thus, an actual temperature of the switching element 24 is substantially determined by the detection value of the PDU cooling water temperature. Accordingly, the detection value of the PDU cooling water temperature output from the temperature sensor 26 is used as element temperature observation data indicating the observation value of the temperature of the switching element 24.

Note that a detection value output from an appropriate sensor that directly detects the temperature of the switching element 24 or a value estimated using an appropriate model and a detection value of the temperature of another portion of the PDU 11 may be employed as the element temperature observation data.

The ECU 12 is formed from an electronic circuit unit including a central processing unit (CPU), a random access memory (RAM), a read only memory (ROM), and an interface circuit. In this case, the ECU 12 may be formed from a plurality of electronic circuit units that can communicate with one another.

The ECU 12 has functions provided by installed programs and functions provided by the hardware configuration. Examples of such functions include a function to control driving of the electric motor 3 via the inverter 21, a function to control driving of the engine 4 (e.g., control of fuel supply), a function to control the transmission 5, and a function to perform on/off control on the contactor 14.

The ECU 12 includes an element temperature observation data acquiring unit 31, a magnet temperature observation data acquiring unit 32, a rotational speed upper limit setting unit 33, a rotational speed limiting unit 34, a power generation output upper limit setting unit 35, and a power generation output limiting unit 36, which provide, in particular, the functions relating to the present disclosure. The element temperature observation data acquiring unit 31 acquires the element temperature observation data indicating the observation value of the temperature of the switching element 24 of the inverter 21. The magnet temperature observation data acquiring unit 32 acquires the element temperature observation data indicating the observation value of the temperature of the magnet (the permanent magnet) mounted in the rotor of the electric motor 3. The rotational speed upper limit setting unit 33 sets a rotational speed upper limit of the electric motor 3. The rotational speed limiting unit 34 controls the actual rotational speed of the electric motor 3 so that the rotational speed is limited to a value lower than or equal to the rotational speed upper limit. The power generation output upper limit setting unit 35 sets the power generation output upper limit of the electric motor 3. The power generation output limiting unit 36 controls the actual power generation output of the electric motor 3 so that the power generation output is limited to a value lower than or equal to the power generation output upper limit.

More specifically, the rotational speed of the electric motor 3 is the rotational speed of the rotor or an output shaft of the electric motor 3. In this case, the output shaft of the electric motor 3 is a rotation shaft that rotates together with the rotor of the electric motor 3 at a rotational speed proportional to the rotational speed of the rotor. Accordingly, if the electric motor 3 is configured to output the drive power via a speed reducer with a predetermined reduction ratio, the rotational speed of the output shaft of the speed reducer may be considered as the rotational speed of the electric motor 3.

The element temperature observation data acquiring unit 31, the magnet temperature observation data acquiring unit 32, the rotational speed upper limit setting unit 33, the rotational speed limiting unit 34, the power generation output upper limit setting unit 35, and the power generation output limiting unit 36 correspond to an element temperature observation data acquiring unit, a magnet temperature observation data acquiring unit, a rotational speed upper limit setting unit, a rotational speed limiting unit, a power generation output upper limit setting unit, and a power generation output limiting unit of the present disclosure, respectively.

The operation performed by the electric motor control system 1 according to the present exemplary embodiment is described below with reference to the control process performed by the ECU 12.

If a start switch (e.g., an ignition switch) (not illustrated) of the vehicle 2 is turned on, the ECU 12 controls the contactor 14 so that the contactor 14 is turned on. Thereafter, the ECU 12 controls driving of the vehicle 2 including driving of the electric motor 3 and the engine 4 in accordance with, for example, the pedal position of an acceleration pedal (not illustrated) and the detection value of the traveling speed of the vehicle 2.

In such a case, to prevent a voltage that is higher than a predetermined withstand voltage of the switching elements 24 from being applied to the switching elements 24 of the inverter 21 in control of driving the electric motor 3, the ECU 12 performs control so that the actual rotational speed of the electric motor 3 is lower than or equal to a predetermined rotational speed upper limit and the actual power generation output during the regenerative operation is lower than or equal to a predetermined power generation output upper limit.

More specifically, to control the actual rotational speed of the electric motor 3 so that the actual rotational speed is limited to a value lower than or equal to the predetermined rotational speed upper limit, the following operation is performed. That is, the ECU 12 performs the process of the flowchart illustrated in FIG. 3 at a predetermined processing intervals. Thus, the ECU 12 sequentially and variably sets the rotational speed upper limit of the electric motor 3.

That is, the ECU 12 performs the processes in STEPs 1 to 4 using the element temperature observation data acquiring unit 31, as described below.

In STEP 1, the element temperature observation data acquiring unit 31 acquires, as a value having a certain correlation with the temperature of the switching elements 24 of the inverter 21, the detection value of the PDU cooling water temperature obtained from the detection signal output from the temperature sensor 26.

In STEP 2 that follows STEP 1, the element temperature observation data acquiring unit 31 determines whether the temperature sensor 26 is normally operating. This determination is made on the basis of the detection signal output from the temperature sensor 26.

If the determination made in STEP 2 is positive (if the temperature sensor 26 is normally operating), the element temperature observation data acquiring unit 31 determines the value of the element temperature observation data (the value of a temperature indicating the observation value of the temperature of the switching elements 24 of the inverter 21) in STEP 3.

In STEP 3, the element temperature observation data acquiring unit 31 sets the value of the element temperature observation data to a value obtained by correcting the detection value of the PDU cooling water temperature acquired in STEP 1 with the detection error. Hereinafter, the corrected value is referred to as an "error-corrected detection value". More specifically, if the error in the detection value of the PDU cooling water temperature is in a range from −α% to +α% of the detection value, the error-corrected detection value is set to a value obtained by subtracting α% from the detection value of the PDU cooling water temperature acquired in STEP 1 (i.e., the lowest value among the values within the error range).

Accordingly, the error-corrected detection value of the PDU cooling water temperature is obtained so as not to exceed the actual PDU cooling water temperature.

However, if the determination made in STEP 2 is negative (if the temperature sensor 26 malfunctions), the element temperature observation data acquiring unit 31 determines the value of the element temperature observation data in STEP 4.

In STEP 4, the value of the element temperature observation data is set to the predetermined lowest temperature, which is the lowest temperature among temperatures within an estimated variable range of the PDU cooling water temperature.

Subsequently, the ECU 12 performs the processes in STEPs 5 to 8 using the magnet temperature observation data acquiring unit 32.

In STEP 5, the magnet temperature observation data acquiring unit 32 acquires, as a value having a certain correlation with the temperature of the magnet of the electric motor 3, the detection value of the electric motor lubricant oil temperature obtained from the detection signal output from the temperature sensor 13.

In STEP 6 that follows STEP 5, the magnet temperature observation data acquiring unit 32 determines whether the temperature sensor 13 is operating normally. This determination is made on the basis of the detection signal output from the temperature sensor 13.

If the determination made in STEP 6 is positive (if the temperature sensor 13 is operating normally), the magnet temperature observation data acquiring unit 32 performs, in STEP 7, a process that is the same as the process in STEP 3. Thus, the magnet temperature observation data acquiring unit 32 determines the value of the magnet temperature observation data (the value of temperature indicating the observation value of the temperature of the magnet of the electric motor 3).

That is, in STEP 7, the magnet temperature observation data acquiring unit 32 sets the value of the magnet temperature observation data to a value obtained by correcting the detection value of the electric motor lubricant oil temperature acquired in STEP 5 with the detection error (i.e., the lowest value among values within the error range). In this manner, the error-corrected detection value of the electric motor lubricant oil temperature is obtained so as not to exceed the actual value of the electric motor lubricant oil temperature.

However, if the determination made in STEP 6 is negative (if the temperature sensor 13 malfunctions), the magnet temperature observation data acquiring unit 32 performs, in STEP 8, a process that is similar to the process in STEP 4 and determines the value of the magnet temperature observation data.

That is, in STEP 8, the value of the magnet temperature observation data is set to the predetermined lowest temperature, which is the lowest temperature among temperatures within an estimated variable range of the electric motor lubricant oil temperature.

After the value of the element temperature observation data and the value of the magnet temperature observation data are determined in the above-described manner, the ECU 12 performs a process in STEP 9 using the rotational speed upper limit setting unit 33. In this process, the rotational speed upper limit setting unit 33 sets the rotational speed upper limit of the electric motor 3 on the basis of a map generated using the characteristic illustrated in FIG. 4 in advance and using the observation value of the temperature of the switching elements 24 indicated by the value of the element temperature observation data determined in STEP 3 or 4 and the observation value of the temperature of the magnet indicated by the value of the magnet temperature observation data determined in STEP 7 or 8.

Figure 4:
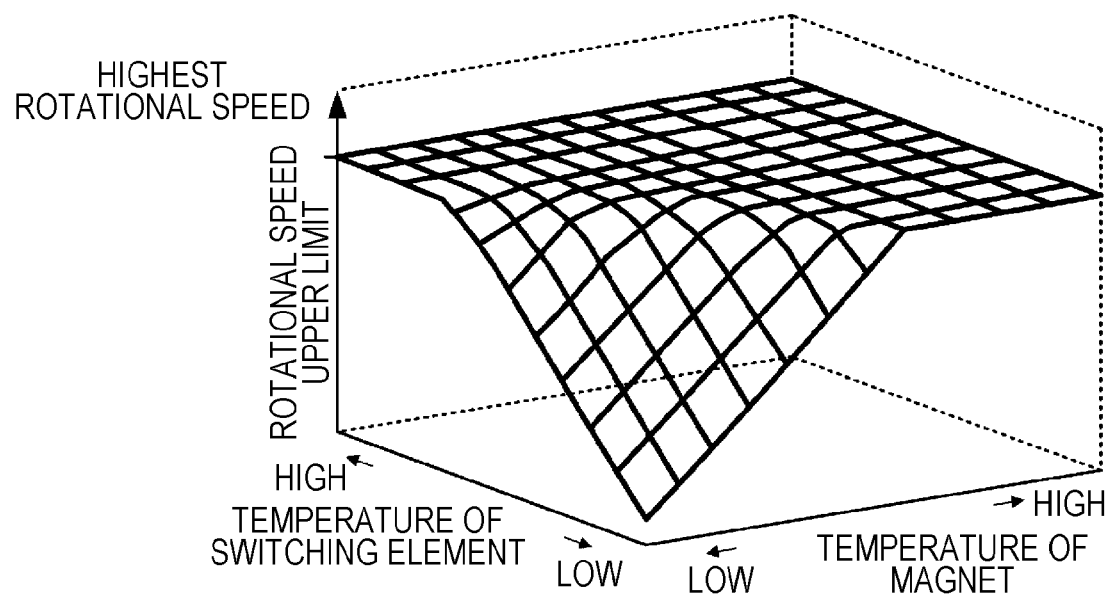
FIG. 4 is a graph indicating a map used in a process performed in STEP 9 illustrated in FIG. 3.
Figure 5:
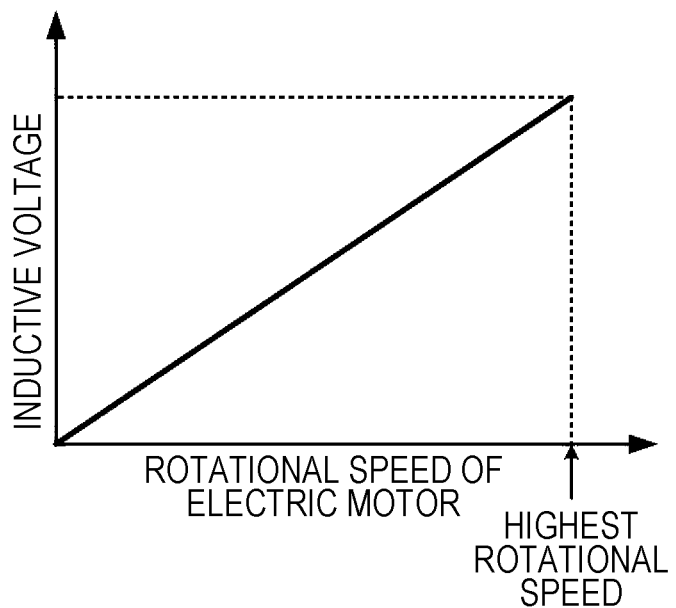
FIG. 5 is a graph illustrating a relationship between the rotational speed and an inductive voltage of the electric motor according to the exemplary embodiment.

The setting guide of the rotational speed upper limit based on the map illustrated in FIG. 4 is described below. The stator coil for each of the phases of the electric motor 3 generates an inductive voltage having a magnitude in accordance with the rotational speed of the rotor. As indicated by a graph illustrated in FIG. 5, the magnitude of the inductive voltage increases with increasing rotational speed of the electric motor 3.

Note that in general, the magnetic flux generated by the magnet (the permanent magnet) mounted in the rotor of the electric motor 3 increases with decreasing temperature of the magnet. Accordingly, the magnitude of the inductive voltage generated by the stator coil of the electric motor 3 when the rotor is rotating at a constant speed tends to increase with decreasing temperature of the magnet of the electric motor 3.

When electric power is distributed to the stator coil of each of the phases of the electric motor 3 and if any one of the switching elements 24 of the inverter 21 malfunctions and stays in an off mode (hereinafter referred to as "element off malfunction") and, thus, power distribution via the switching elements 24 is interrupted, an abnormal voltage is applied to one of the switching elements 24. The abnormal voltage is generated by the above-described inductive voltage and is higher than in the case in which on/off control is normally performed on each of the switching elements 24 of the inverter 21 (the power is normally distributed to the stator coil of each of the phases of the electric motor 3). The abnormal voltage corresponds to the above-described first abnormal voltage.

The magnitude of the first abnormal voltage increases with increasing rotational speed of the electric motor 3. Accordingly, when the electric motor 3 operates at a rotational speed in the high speed range, the magnitude of the first abnormal voltage generated due to the element off malfunction is substantially the highest level of voltage among the voltages applied to the switching elements 24 during the operation of the electric motor 3.

Note that if the rotational speed of the electric motor 3 is constant, the first abnormal voltage applicable to the switching elements 24 increases with decreasing temperature of the magnet of the rotor of the electric motor 3.

Thus, according to the present exemplary embodiment, the rotational speed upper limit setting unit 33 sets the rotational speed upper limit of the electric motor 3 so that the magnitude of the first abnormal voltage reliably has a value lower than or equal to the withstand voltage (the upper limit value of the applied voltage) of the switching elements 24 even when the first abnormal voltage is generated by the above-described element off malfunction during the operation performed by the electric motor 3 at the rotational speed upper limit.

In contrast, in general, the withstand voltage of a switching element formed from a semiconductor switching element, such as IGBT, tends to decrease with decreasing temperature of the switching element. For example, according to the present exemplary embodiment, the withstand voltage of the switching element 24 has a characteristic indicated by a graph in FIG. 6 with respect to the temperature of the switching element 24.

In addition, according to the present exemplary embodiment, in a temperature range in which the withstand voltage of the switching element 24 is relatively high (e.g., the temperature range higher than or equal to a predetermined temperature T1 illustrated in FIG. 6) (hereinafter referred to as a "high withstand voltage temperature range"), the switching element 24 has a withstand voltage characteristic so that the magnitude of the first abnormal voltage is relatively close to the withstand voltage of the switching element 24 and is lower than or equal to the withstand voltage even when the first abnormal voltage is generated with the electric motor 3 operating at the highest rotational speed of the electric motor 3 determined in the specification of the electric motor control system 1. That is, a switching element having such a withstand voltage characteristic is employed as the switching element 24 of the present exemplary embodiment.

Thus, according to the present exemplary embodiment, if the actual temperature of the switching elements 24 is a temperature within the high withstand voltage temperature range, the rotational speed upper limit of the electric motor 3 is set to the above-described highest rotational speed.

In addition, in the temperature range lower than the high withstand voltage temperature range, the withstand voltage of the switching element 24 decreases. Accordingly, when the electric motor 3 operates at the highest rotational speed of the electric motor 3 and if the first abnormal voltage is generated, the magnitude of the first abnormal voltage may exceed the withstand voltage of the switching element 24.

Thus, according to the present exemplary embodiment, in the temperature range lower than the high withstand voltage temperature range, to prevent the magnitude of the first abnormal voltage applicable to the switching elements 24 from exceeding the withstand voltage of the switching element 24, the rotational speed upper limit of the electric motor 3 is limited to a rotational speed lower than or equal to the highest rotational speed.

That is, in the temperature range lower than the high withstand voltage temperature range, the rotational speed upper limit is set so that the magnitude of the first abnormal voltage is lower than or equal to a withstand voltage determined in accordance with the temperature of the switching element 24 even when the first abnormal voltage is generated in response to element off malfunction during the operation of the electric motor 3 at the rotational speed upper limit. In such a case, since the withstand voltage of the switching element 24 decreases with decreasing temperature of the switching element 24, the rotational speed upper limit is set so as to decrease with decreasing temperature of the switching element 24.

As described above, according to the present exemplary embodiment, if the temperature of the switching element 24 is a temperature in the high withstand voltage temperature range, the rotational speed upper limit of the electric motor 3 is set to the highest rotational speed predetermined in the specification of the electric motor control system 1. However, if the temperature of the switching element 24 is a temperature lower than the high withstand voltage temperature range, the rotational speed upper limit of the electric motor 3 is set so that the magnitude of the first abnormal voltage that may be generated during the operation of the electric motor 3 at the rotational speed upper limit is lower than or equal to the withstand voltage of the switching element 24.

The basic setting guide of the rotational speed upper limit of the electric motor 3 according to the present exemplary embodiment has been described above. To variably set the rotational speed upper limit of the electric motor 3 on the basis of the setting guide, the rotational speed upper limit setting unit 33 sets the rotational speed upper limit of the electric motor 3 on the basis of the map illustrated in FIG. 4 using the observation value of the temperature of the switching element 24 indicated by the value of the element temperature observation data determined in STEP 3 or 4 and the observation value of the temperature of the magnet indicated by the value of the magnet temperature observation data determined in STEP 7 or 8.

Basically, the map is generated so that the rotational speed upper limit decreases with decreasing temperature of the switching element 24 in a temperature range in which the observation value of the temperature of the switching element 24 is relatively low and, in addition, the rotational speed upper limit decreases with decreasing temperature in a temperature range in which the observation value of the temperature of the magnet is relatively low.

More specifically, let Ta be the observation value of the temperature of the switching element 24, and let Tb be the observation value of the temperature of the magnet. Then, a rotational speed upper limit determined on the basis of the map illustrated in FIG. 4 using the values Ta and Tb is set so that the magnitude of the first abnormal voltage that may be generated during the operation of the electric motor 3 at the rotational speed upper limit under the assumption that the temperature of the magnet is Tb is less than or equal to the withstand voltage of the switching element 24 having a temperature of Ta and is close to the withstand voltage. In such a case, if the temperature Ta of the switching elements 24 is a temperature in the high withstand voltage temperature range (e.g., a temperature higher than or equal to T1 illustrated in FIG. 6), the rotational speed upper limit is set to the highest rotational speed. A map that can set such a rotational speed upper limit is generated in advance through, for example, an experiment.

In STEP 9, the rotational speed upper limit setting unit 33 sequentially determines the rotational speed upper limit of the electric motor 3 on the basis of the map generated in the above-described manner. Accordingly, the rotational speed upper limit of the electric motor 3 is set in accordance with the observation value of the temperature of the switching element 24 indicated by the element temperature observation data and the observation value of the temperature of the magnet indicated by the magnet temperature observation data so that the following condition is satisfied: a voltage applicable to the switching elements 24 when the electric motor 3 is operated at the rotational speed upper limit (including the first abnormal voltage, which is one of the applied voltages) is lower than or equal to the value of the withstand voltage corresponding to the observation value of the temperature of the switching element 24 indicated by the element temperature observation data (a condition corresponding to a first condition of the present disclosure).

In this case, the rotational speed upper limit is set so as to be maximally equal or close to the highest rotational speed.

The ECU 12 causes the rotational speed limiting unit 34 to perform the process using the rotational speed upper limit set in this manner. The rotational speed limiting unit 34 controls the rotational speed of the electric motor 3 so that the detection value of the actual rotational speed of the electric motor 3 obtained from the detection signal of a rotation speed sensor (not illustrated) is lower than or equal to the rotational speed upper limit set by the rotational speed upper limit setting unit 33.

More specifically, if the detection value of the rotational speed of the electric motor 3 exceeds a rotational speed threshold value that is slightly lower than the rotational speed upper limit (a rotational speed threshold value that is lower than the rotational speed upper limit by a predetermined value), the rotational speed limiting unit 34 controls the gear ratio of the transmission 5. In this manner, the rotational speed limiting unit 34 controls the transmission 5 so that the rotational speed of the electric motor 3 is lower than or equal to the rotational speed upper limit.

Note that instead of controlling the gear ratio of the transmission 5 as described above, the rotational speed limiting unit 34 may reduce the rotational speed of the electric motor 3 by disconnecting a power transfer system disposed between the electric motor 3 and the drive wheel 6 using, for example, a clutch mechanism. Alternatively, the rotational speed limiting unit 34 may reduce the rotational speed of the electric motor 3 by controlling the rotational speed of the engine 4. Still alternatively, the rotational speed limiting unit 34 may reduce the rotational speed of the electric motor 3 by reducing the travel speed of the vehicle 2 using a braking device.

The control process for limiting the rotational speed of the electric motor 3 to a speed lower than or equal to the rotational speed upper limit is performed as described below.

A control process for limiting an actual power generation output during a regenerative operation performed by the electric motor 3 to a generation output lower than or equal to a predetermined power generation output upper limit is described below. The control process is performed as follows. That is, the ECU 12 sequentially and variably sets the power generation output upper limit of the electric motor 3 by performing the process indicated by a flowchart in FIG. 7 at predetermined control processing intervals.

The ECU 12 performs the processes in STEPs 11 to 14 using the element temperature observation data acquiring unit 31. The processes in STEPs 11 to 14 are the same as the processes in STEPs 1 to 4 illustrated in FIG. 3, respectively. In this manner, the value of the element temperature observation data is determined.

Subsequently, the ECU 12 performs a process in STEP 15 using the power generation output upper limit setting unit 35. In this process, the power generation output upper limit setting unit 35 sets the power generation output upper limit of the electric motor 3 on the basis of a map generated in advance and indicating a characteristic illustrated in FIG. 8 using the observation value of the temperature of the switching element 24 indicated by the value of the element temperature observation data determined in STEP 13 or 14.

Figure 8:
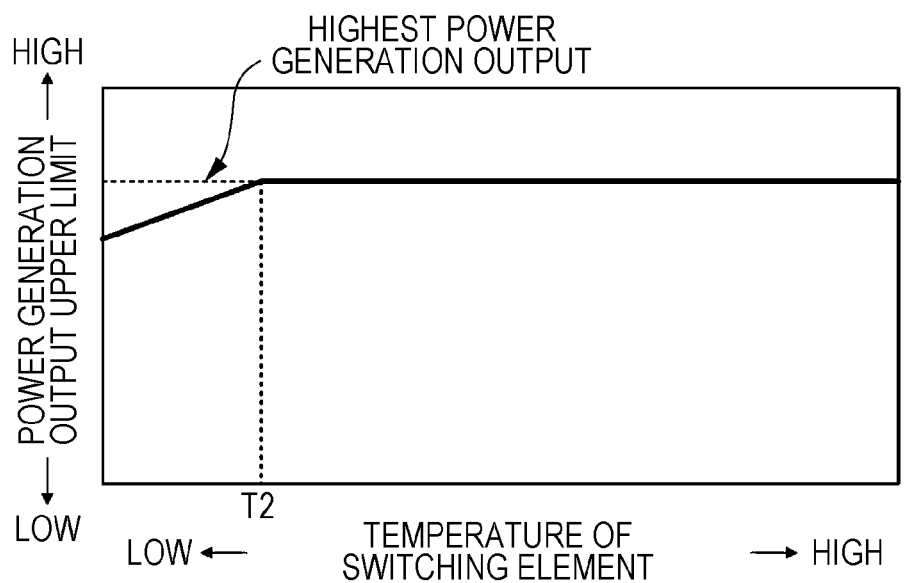
FIG. 8 is a graph indicating a map used in STEP 15 illustrated in FIG. 7.

The setting guide of the power generation output upper limit on the basis of the map illustrated in FIG. 8 is described below. If, for example, the contactor 14 is accidentally turned off from on and stays in an off mode (hereinafter referred to as "contactor-off malfunction") during a regenerative operation performed by the electric motor 3 (and, thus distribution of electric power between the inverter 21 and the electricity storage device 10 is interrupted), the ECU 12 controls all the switching elements 24 of the inverter 21 into an off state to stop the regenerative operation performed by the electric motor 3.

Figure 9:
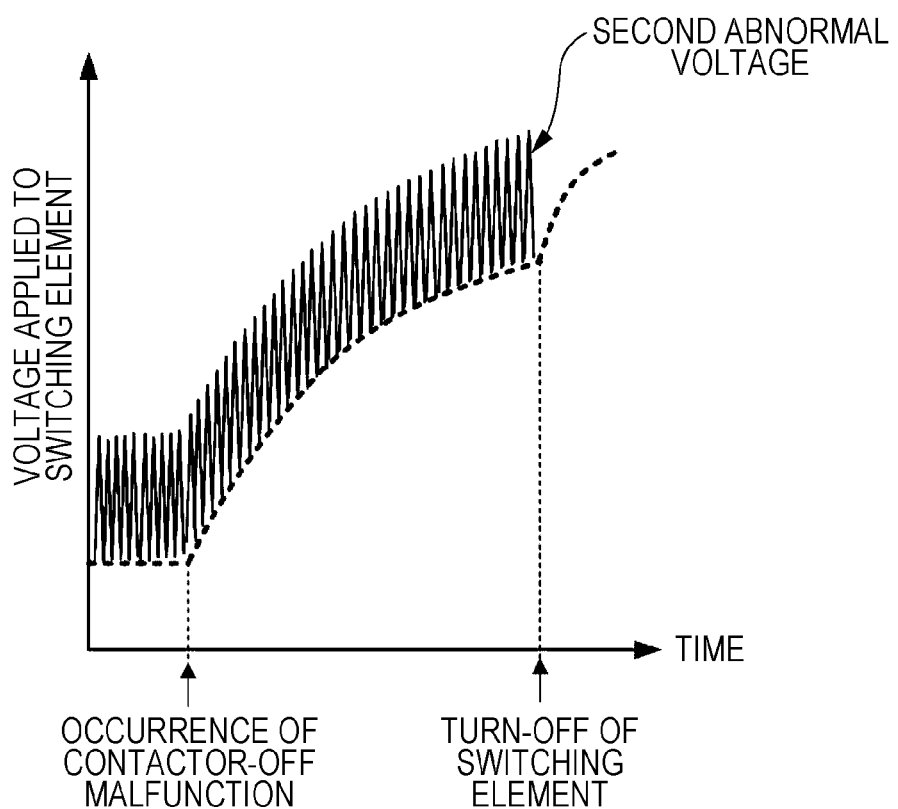
FIG. 9 is a graph illustrating an example of a variation of a voltage applied to the switching element with time during a regenerative operation performed by the electric motor according to the exemplary embodiment.

At that time, the timing at which all the switching elements 24 of the inverter 21 are completely off is slightly delayed from the timing at which the contactor-off malfunction occurs. During such a delay time, an abnormal voltage that generally vibrates and rises as indicated by a solid line in FIG. 9 is applied to each of the switching elements 24. The abnormal voltage corresponds to the above-described second abnormal voltage.

More specifically, if contactor-off malfunction occurs during a regenerative operation performed by the electric motor 3, the electric power generated by the electric motor 3 is not supplied to the electricity storage device 10. Accordingly, the charge voltage of the smoothing capacitor 15 disposed between the contactor 14 and the inverter 21 rapidly increases due to the electric power generated by the electric motor 3. The increase in the charge voltage of the smoothing capacitor 15 increases a low-frequency component of the second abnormal voltage generated by contactor-off malfunction, as indicated by a dashed line in the graph illustrated in FIG. 9.

In addition, the low-frequency component of the second abnormal voltage is superimposed with a high-frequency surge voltage component generated due to on/off control of the switching elements 24 or a voltage rising component generated due to energy emission of the stator coil of the electric motor 3.

As a result, the second abnormal voltage generated due to the contactor-off malfunction vibrates and rises during the delay time occurring immediately after the occurrence of contactor-off malfunction, as illustrated in the graph of FIG. 9.

In this case, the highest value that the second abnormal voltage reaches during the delay time increases with increasing electric power generated by the electric motor 3 during the regenerative operation. Accordingly, during the operation performed by the electric motor 3 at a rotational speed in the high speed range, the magnitude of the second abnormal voltage generated due to contactor-off malfunction is substantially the highest level of voltage among the voltages applied to the switching elements 24 during the regenerative operation performed by the electric motor 3.

Thus, according to the present exemplary embodiment, the power generation output upper limit setting unit 35 sets the power generation output upper limit of the electric motor 3 so that even when the second abnormal voltage is generated in response to the contactor-off malfunction during the operation of the electric motor 3 at the power generation output upper limit, the highest value of the second abnormal voltage reached during the delay time is reliably lower than or equal to the withstand voltage of the switching element 24.

At that time, according to the present exemplary embodiment, each of the switching elements 24 has a withstand voltage characteristic so that if the temperature of the switching element 24 is within the temperature range higher than or equal to a predetermined temperature T2 illustrated in FIG. 8, the magnitude of the second abnormal voltage generated in response to the contactor-off malfunction (the highest value reached during the delay time) is lower than or equal to the withstand voltage of the switching element 24 even when the power generation output during a regenerative operation performed by the electric motor 3 is the highest power generation output predetermined in the specification of the electric motor control system 1.

Figure 6:
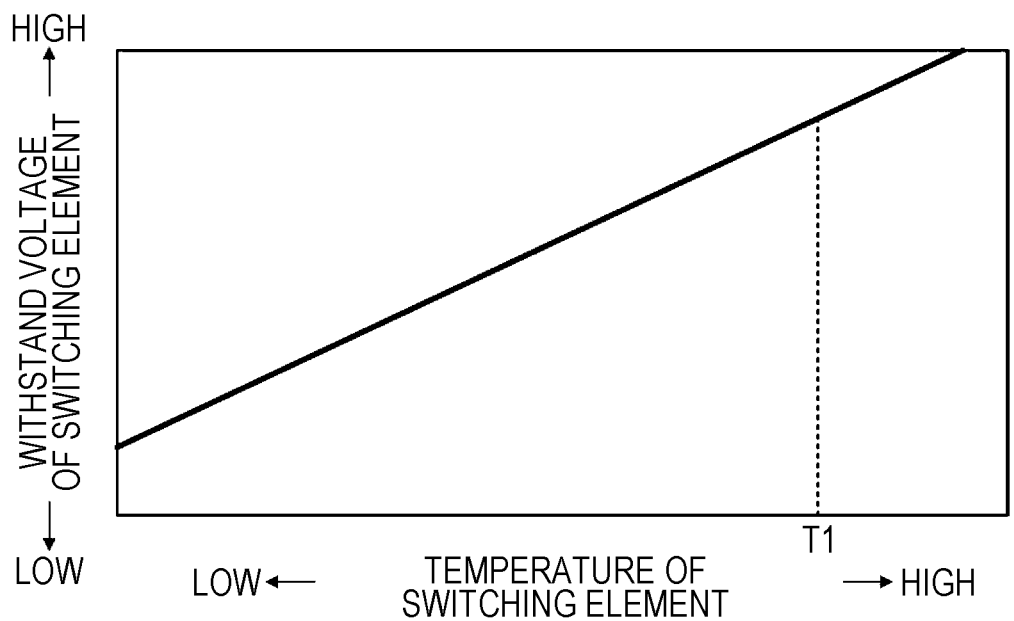
FIG. 6 is a graph illustrating a relationship between the temperature and the withstand voltage of the switching element according to the exemplary embodiment.
Figure 7:
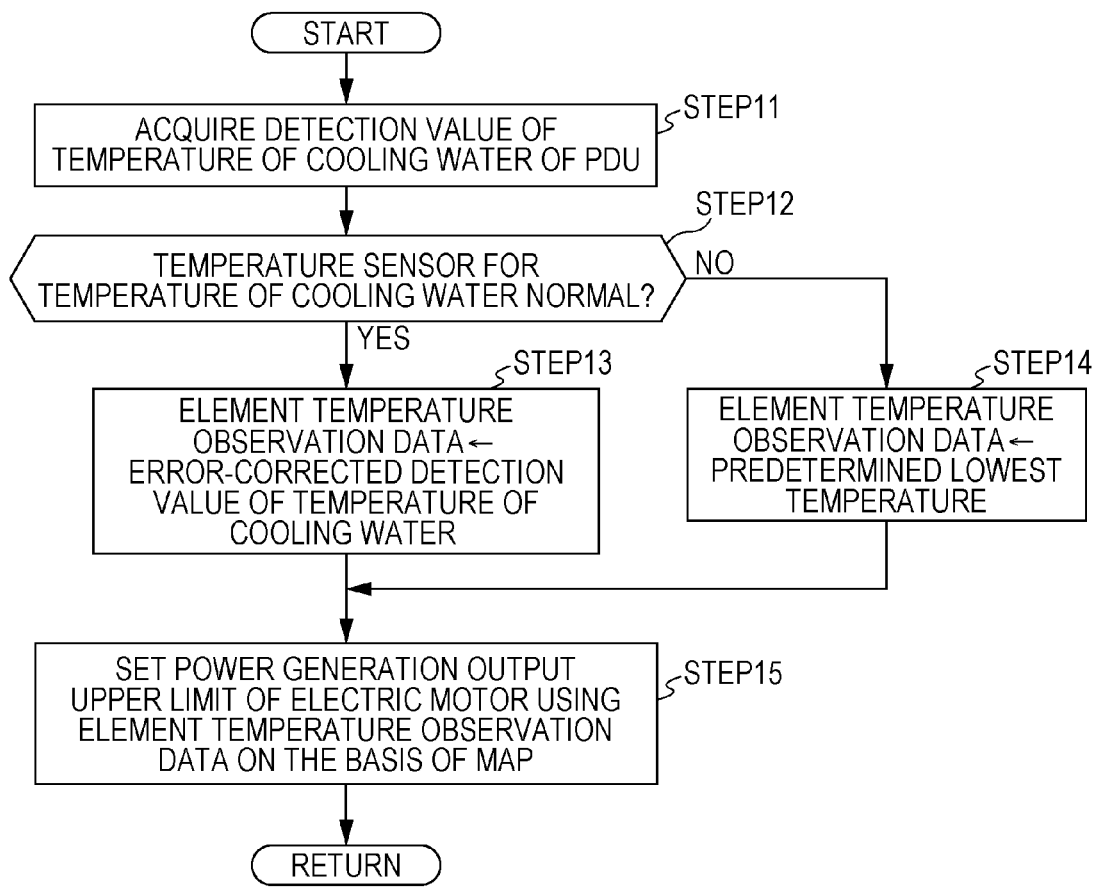
FIG. 7 is a flowchart of a process for setting a power generation output upper limit during a rotational operation performed by the electric motor according to the exemplary embodiment.

Accordingly, in the present exemplary embodiment, each of the switching elements 24 has a withstand voltage characteristic that satisfies the following conditions: the withstand voltage of the switching element 24 is higher than or equal to the magnitude of the first abnormal voltage that may occur during the operation of the electric motor 3 at the highest rotational speed of the electric motor 3 in the temperature range higher than or equal to the predetermined temperature T1 illustrated in FIG. 6 (in the high withstand voltage temperature range) and, in addition, in the temperature range higher than or equal to the predetermined temperature T2 illustrated in FIG. 8, the magnitude of the second abnormal voltage generated at the time of contactor-off malfunction (the highest value reached during the delay time) does not exceed the withstand voltage of the switching element 24 even when the power generation output during a regenerative operation performed by the electric motor 3 is the highest power generation output.

Thus, according to the present exemplary embodiment, if an actual temperature of the switching elements 24 is higher than or equal to the predetermined temperature T2, the power generation output upper limit during a regenerative operation performed by the electric motor 3 is set to the above-described highest power generation output.

However, if the actual temperature of the switching elements 24 is lower than the predetermined temperature T2 and if contactor-off malfunction occurs during the regenerative operation performed by the electric motor 3 with the highest power generation, the highest value of the second abnormal voltage generated in response to the contactor-off malfunction may exceed the withstand voltage of the switching element 24.

Thus, according to the present exemplary embodiment, in the temperature range lower than the predetermined temperature T2, the power generation output upper limit during a regenerative operation performed by the electric motor 3 is limited to a power generation output that is lower than or equal to the highest power generation output to prevent the highest value of the second abnormal voltage generated in response to the contactor-off malfunction from exceeding the withstand voltage of the switching element 24. That is, in the temperature range lower than the predetermined temperature T2, the power generation output upper limit is set so that even when the contactor-off malfunction occurs during the regenerative operation performed by the electric motor 3 with the power generation output upper limit, the highest value of the second abnormal voltage generated in response to the contactor-off malfunction (the highest value reached during the delay time) is lower than or equal to the withstand voltage of the switching element 24. In this case, since the withstand voltage of the switching element 24 decreases with decreasing temperature of the switching element 24, the power generation output upper limit is set so as to decrease with decreasing temperature of the switching element 24.

As described above, according to the present exemplary embodiment, if the temperature of the switching element 24 is higher than or equal to the predetermined temperature T2, the power generation output upper limit of the electric motor 3 is set to the highest power generation output predetermined in the specification of the electric motor control system 1. In the temperature range lower than the predetermined temperature T2, the power generation output upper limit of the electric motor 3 is set so that the highest value of the second abnormal voltage generated in response to the contactor-off malfunction during the regenerative operation performed by the electric motor 3 with the power generation output upper limit is lower than or equal to the withstand voltage of the switching element 24.

The setting guide of the power generation output upper limit of the electric motor 3 according to the present exemplary embodiment is determined as described above. To variably set the power generation output upper limit of the electric motor 3 in accordance with such a setting guide, the power generation output upper limit setting unit 35 sets the power generation output upper limit of the electric motor 3 in accordance with the observation value of the temperature of the switching element 24 indicated by the value of the element temperature observation data determined in STEP 13 or 14 on the basis of the map illustrated in FIG. 8.

The map is generated so that if the observation value of the temperature of the switching element 24 is higher than or equal to the predetermined temperature T2, the power generation output upper limit is set to the highest power generation output and, in addition, if the observation value of the temperature of the switching element 24 is lower than the predetermined temperature T2, the power generation output upper limit decreases with decreasing observation value of the temperature of the switching element 24.

More specifically, let Ta be the observation value of the temperature of the switching element 24. Then, the power generation output upper limit determined on the basis of the map illustrated in FIG. 8 using the observation value Ta is set so that the highest value of the second abnormal voltage generated in response to the contactor-off malfunction during the regenerative operation performed by the electric motor 3 with the power generation output upper limit (the highest value reached during the delay time) is less than or equal to the withstand voltage of the switching element 24 when the temperature of the switching element 24 is Ta and is close to the withstand voltage. In this case, if the temperature Ta of the switching element 24 is higher than or equal to the predetermined temperature T2, the power generation output upper limit is set to the highest power generation output. A map that can set such a power generation output upper limit is generated in advance through, for example, an experiment.

In STEP 15, the power generation output upper limit setting unit 35 sequentially sets the power generation output upper limit of the electric motor 3 on the basis of the map generated in the above-described manner. Thus, the power generation output upper limit of the electric motor 3 is set in accordance with the observation value of the temperature of the switching element 24 indicated by the element temperature observation data so as to satisfy the condition that a voltage applicable to the switching elements 24 during the regenerative operation performed by the electric motor 3 at the power generation output upper limit (including the second abnormal voltage, which is one of the applied voltages) is lower than or equal to the value of the withstand voltage determined in accordance with the observation value of the temperature of the switching element 24 indicated by the element temperature observation data (a condition corresponding to a second condition of the present disclosure).

In addition, in such a case, the power generation output upper limit is set so as to be maximally equal to the highest power generation output or close to the highest power generation output.

During a regenerative operation performed by the electric motor 3, the ECU 12 causes the power generation output limiting unit 36 to perform the process using the power generation output upper limit set in the above-described manner. The power generation output limiting unit 36 controls the electric motor 3 so that the power generated by the electric motor 3 is less than or equal to the power generation output upper limit set by the power generation output upper limit setting unit 35.

For example, the power generation output limiting unit 36 decreases a target power generation output of the electric motor 3 if the target power generation output determined in accordance with the remaining amount of charge in the electricity storage device 10 exceeds a generation power threshold value that is set so as to be slightly lower than the power generation output upper limit set by the power generation output upper limit setting unit 35 (a generation power threshold value that is lower than the power generation output upper limit by a predetermined amount). In addition, the power generation output limiting unit 36 performs on/off control on the switching elements 24 of the inverter 21 so that the regenerative operation is performed by the electric motor 3 to provide the target power generation output.

The control process that limits the power generation output during a regenerative operation performed by the electric motor 3 to a value lower than or equal to the power generation output upper limit is performed as described below.

According to the above-described present exemplary embodiment, the rotational speed upper limit and the power generation output upper limit of the electric motor 3 are set in the above-described manner, so that the actual rotational speed and the power generation output of the electric motor 3 are limited to values lower than or equal to the rotational speed upper limit and the power generation output upper limit, respectively. In this manner, the magnitude of the voltage applicable to the switching element 24 (including the first abnormal voltage and the second abnormal voltage) can be made lower than or equal to the withstand voltage of the switching element 24 regardless of the temperature of the switching element 24.

In such a case, the rotational speed upper limit and the power generation output upper limit of the electric motor 3 are set while taking into account a variation in the withstand voltage of the switching element 24 in accordance with the temperature of the switching element 24. Accordingly, even when the withstand voltage of the switching element 24 is not so high, the electric motor 3 can be operated at the highest rotational speed or a rotational speed close to the highest rotational speed in the most temperature range of the entire variable range of the temperature of the switching element 24. Alternatively, the electric motor 3 can perform the regenerative operation to provide the highest power generation output or a power generation output close to the highest power generation output.

That is, the electric motor 3 can be operated so that limitations on the performance of the electric motor 3 are minimized.

In addition, according to the present exemplary embodiment, the rotational speed upper limit of the electric motor 3 is set by taking into account the temperature of the magnet mounted in the rotor of the electric motor 3 in addition to the temperature of the switching element 24. Furthermore, the element temperature observation data and the magnet temperature observation data used to determine the rotational speed upper limit are determined while taking into account detection errors of the temperature sensors 26 and 13 and the occurrence of malfunction of the temperature sensors 26 and 13.

Accordingly, the rotational speed upper limit that reliably determines a voltage applicable to the switching elements 24 during the operation performed by the electric motor 3 to a value lower than or equal to the withstand voltage of the switching element 24 can be set. As a result, the rotational speed upper limit can be set so as to be maximized (i.e., so as to be equal to the highest rotational speed or a speed close to the highest rotational speed).

In addition, the element temperature observation data used to determine the power generation output upper limit is determined while taking into account a detection error in the temperature sensor 26. Accordingly, the power generation output upper limit that reliably determines a voltage applicable to the switching elements 24 during a regenerative operation performed by the electric motor 3 to a value lower than or equal to the withstand voltage of the switching element 24 can be set. As a result, the power generation output upper limit can be set so as to be maximized (i.e., so as to be equal to the highest power generation output or a power generation output close to the highest power generation output).

In addition, the rotational speed upper limit and the power generation output upper limit of the electric motor 3 are set while taking into account a variation of the withstand voltage of the switching element 24 in accordance with the temperature of the switching element 24. Accordingly, the switching elements 24 of the inverter 21 need not have a withstand voltage that is significantly high.

In general, the switching element 24 having a higher withstand voltage more readily causes energy loss during the operation of the inverter 21. However, by using the switching element 24 having a minimal withstand voltage, the energy loss of the inverter 21 can be reduced.

In addition, in the entire variable range of the temperature of the switching element 24, a voltage that is sufficiently close to the withstand voltage can be applied to the switching element 24. Thus, the magnitude of a surge voltage generated in response to on/off control of the switching element 24 is allowed to be relatively large. Accordingly, the on/off control of the switching element 24 can be performed so that the on/off switching speed (a variation speed from an on state to an off state and vice versa) of the switching element 24 increases. As a result, switching loss of the switching element 24 can be reduced.

Some modifications of the above-described exemplary embodiment are described below.

In the above-described exemplary embodiment, the rotational speed upper limit and the power generation output upper limit of the electric motor 3 are set so that a voltage applicable to the switching elements 24 is lower than or equal to the withstand voltage. However, if the highest power generation output of the electric motor 3 defined in the specification of the electric motor control system 1 is not so high, only the rotational speed upper limit may be set.

Alternatively, if the highest rotational speed of the electric motor 3 defined in the specification of the electric motor control system 1 is not so high, only the power generation output upper limit may be set.

Furthermore, in the above-described exemplary embodiment, to set the rotational speed upper limit, the magnet temperature observation data is used in addition to the element temperature observation data. However, if a variation of the magnetic flux of a magnet mounted in the rotor of the electric motor 3 is sufficiently small in the expected variable temperature range, the rotational speed upper limit may be set by using only the element temperature observation data.

Still furthermore, while the above-described exemplary embodiment has been described with reference to the electric motor control system 1 mounted in the hybrid vehicle 2 as an example, the electric motor control system of the present disclosure may be mounted in electric vehicles or systems other than vehicles.

According to a first aspect of the present disclosure, an electric motor control system includes an inverter including a plurality of switching elements, where electric power is distributed between a DC power source and an electric motor via the inverter, an element temperature observation data acquiring unit that acquires element temperature observation data indicating an observation value of a temperature of the switching elements of the inverter, a rotational speed upper limit setting unit that sets a rotational speed upper limit of the electric motor in accordance with the observation value of the temperature indicated by the element temperature observation data, and a rotational speed limiting unit that controls the rotational speed of the electric motor so that an actual rotational speed of the electric motor is lower than or equal to the rotational speed upper limit. The rotational speed upper limit setting unit sets the rotational speed upper limit in accordance with the observation value of a temperature indicated by the element temperature observation data so as to satisfy a first condition that a voltage applicable to the switching elements when the electric motor is operated at the rotational speed upper limit is lower than or equal to a withstand voltage of the switching elements. The withstand voltage is determined in accordance with the observation value of a temperature indicated by the element temperature observation data on the basis of a predetermined relationship between the withstand voltage and a temperature of the switching elements, indicating that the withstand voltage increases with increasing temperature of the switching elements (a first disclosure).

Note that as used herein, the term "observation value" of any state quantity X, such as an observation value of the temperature of the switching element, refers to a detection value or an estimated value of the state quantity X. In this case, the term "detection value" of the state quantity X refers to a value of the state quantity X directly detected by an appropriate sensor. In addition, the term "estimated value" of the state quantity X refers to a value of the state quantity X estimated using at least one state quantity which is other than the state quantity X but which has a certain relationship with the state quantity X.

Furthermore, the term "data" indicating the "observation value" of the state quantity X, such as the element temperature observation data, refers to the "observation value" of the state quantity X or at least one state quantity which is other than the state quantity X but which has a certain relationship with the state quantity X (i.e., which determines the value of the state quantity X).

According to the first disclosure, the rotational speed upper limit setting unit sets the rotational speed upper limit of the electric motor in accordance with the observation value of the temperature (the temperature of the switching elements of the inverter) indicated by the element temperature observation data.

At that time, in the electric motor, an inductive voltage in accordance with the rotational speed of the electric motor is generated. The magnitude of the inductive voltage increases with increasing rotational speed of the electric motor. In addition, according to a variety of experiments and studies conducted by the present inventors, if some malfunction occurs during the operation of the electric motor (e.g., a malfunction that interrupts distribution of electric power applied to the stator coil of the electric motor), an abnormal voltage that is higher than a voltage during a normal operation may be applied to the switching elements of the inverter (hereinafter also referred to as a "first abnormal voltage") due to the inductive voltage.

The magnitude of the first abnormal voltage increases with increasing rotational speed of the electric motor. Accordingly, when the electric motor operates at the rotational speed upper limit, the first abnormal voltage can become the highest voltage among the voltages that are applicable to the switching elements of the inverter.

In contrast, the withstand voltage of each of the switching elements of the inverter depends on the temperature of the switching element. A relationship between the withstand voltage and the temperature of the switching element is that the withstand voltage increases with increasing temperature (that is, the withstand voltage decreases with decreasing temperature).

Thus, according to the present disclosure, the rotational speed upper limit setting unit sets the rotational speed upper limit in accordance with the observation value of a temperature indicated by the element temperature observation data so as to satisfy a first condition that a voltage applicable to the switching elements when the electric motor is operated at the rotational speed upper limit (the voltage includes the first abnormal voltage) is lower than or equal to a withstand voltage of the switching elements, where the withstand voltage is determined in accordance with the observation value of a temperature indicated by the element temperature observation data on the basis of the predetermined relationship between the withstand voltage and a temperature of the switching elements.

Note that in such a case, the withstand voltage of the switching element decreases with decreasing temperature of the switching element. Accordingly, by basically setting the rotational speed upper limit so that the rotational speed upper limit decreases with decreasing observation value of the temperature, the rotational speed upper limit can be set so as to satisfy the first condition.

In this manner, the rotational speed upper limit of the electric motor can be set so that the magnitude of the voltage does not exceed the withstand voltage determined in accordance with the temperature of the switching element even when an abnormally high voltage, such as the first abnormal voltage, is applied to the switching element.

In addition, the rotational speed limiting unit controls the rotational speed of the electric motor so that the actual rotational speed of the electric motor is lower than or equal to the rotational speed upper limit. In this manner, a voltage applicable to the switching element during the operation of the electric motor (during the rotation of the rotor) can be made lower than or equal to the withstand voltage of the switching element without the need for limiting a DC voltage input from the DC power source to the inverter in accordance with the temperature of the switching element.

In such a case, the rotational speed upper limit can be set to as high a rotational speed as possible among the rotational speeds in a range that satisfies the first condition. Accordingly, a temperature range (the temperature range of the switching element) in which the rotational speed upper limit is set to a value that is lower than the highest rotational speed defined in the specification of the electric motor control system can be minimized. In addition, in the other temperature range, the power generation output upper limit of the electric motor can be set to the highest rotational speed or a value very close to the highest rotational speed.

Thus, according to the first disclosure, the electric motor can be appropriately operated without a voltage applied to the switching element of the inverter exceeding the withstand voltage of the switching element while minimizing a limitation imposed on the performance of the electric motor (in particular, the rotational speed of the electric motor).

According to the first disclosure, in general, the rotor of the electric motor has a magnet mounted therein. The magnet serves as a source of generation of a magnetic flux. In addition, in general, magnets have a characteristic so that the generated magnetic flux varies in accordance with the temperature of the magnets. Accordingly, even when the rotational speed of the electric motor is constant, the magnitude of the inductive voltage and thus the magnitude of the first abnormal voltage varies in accordance with the temperature of the magnet.

Therefore, according to the first disclosure, it is desirable that the electric motor control system further include a magnet temperature observation data acquiring unit that acquires the magnet temperature observation data indicating an observation value of the temperature of the magnet mounted in the electric motor, and it is desirable that the rotational speed upper limit setting unit set the rotational speed upper limit in accordance with the observation value of the temperature indicated by the element temperature observation data and the observation value of the temperature indicated by the magnet temperature observation data (a second disclosure).

According to the second disclosure, the rotational speed upper limit that can satisfy the first condition can be set highly reliably. Thus, a temperature range (the temperature range of the switching element) in which the rotational speed upper limit can be made the same as the highest rotational speed can be increased to the maximum.

In the first or second disclosure, in order to satisfy the first condition, it is desirable that the rotational speed upper limit setting unit set the rotational speed upper limit in accordance with the observation value of the temperature indicated by the element temperature observation data so that a voltage applied to the switching elements due to an inductive voltage generated in the electric motor when the electric motor is operated at the rotational speed upper limit with any one of the switching elements of the inverter being turned off is lower than or equal to the withstand voltage (a third disclosure).

At that time, when the switching elements of the inverter are turned off and if the electric motor is operated at the rotational speed upper limit, a voltage applied to the switching elements due to the inductive voltage generated in the electric motor corresponds to the first abnormal voltage applicable to the switching elements when the electric motor is operated at the rotational speed upper limit.

Thus, according to the third disclosure, the rotational speed upper limit that satisfies the first condition can be appropriately set.

In the first to third disclosures, the electric motor control system may further include a power generation output upper limit setting unit that sets a power generation output upper limit during a regenerative operation performed by the electric motor in accordance with the observation value of the temperature indicated by the element temperature observation data and a power generation output limiting unit that controls the power generation output of the electric motor so that an actual power generation output during a regenerative operation performed by the electric motor is limited to a value lower than or equal to the power generation output upper limit. When each of the switching elements of the inverter is subjected to on/off control to cause the electric motor to perform a generative operation at the power generation output upper limit, the power generation output upper limit setting unit may set the power generation output upper limit in accordance with the observation value of the temperature indicated by the element temperature observation data so as to satisfy a second condition that a voltage applicable to the switching element is lower than or equal to the withstand voltage (a fourth disclosure).

According to the fourth disclosure, the power generation output upper limit setting unit sets the power generation output upper limit in accordance with the observation value of a temperature (the temperature of the switching element of the inverter) indicated by the element temperature observation data.

As described in more detail below, a variety of experiments and studies conducted by the present inventors suggest that if a malfunction that interrupts power distribution between the DC power source and the inverter (a malfunction that interrupts distribution of power generated by the electric motor to the electricity storage device disposed on the DC power source side) occurs, an abnormal voltage that is higher than in the normal case (hereinafter also referred to as a "second abnormal voltage") may be applied to the switching element of the inverter immediately after the occurrence of malfunction.

The magnitude of the second abnormal voltage increases with increasing power generation output during a regenerative operation performed by the electric motor. Accordingly, the second abnormal voltage can have a largest level of magnitude among the voltages in a voltage range applied to the switching elements of the inverter when the electric motor performs a regenerative operation at the power generation output upper limit.

Thus, according to the fourth disclosure, the power generation output upper limit setting unit sets the power generation output upper limit in accordance with the observation value of the temperature indicated by the element temperature observation data so as to satisfy the second condition that a voltage that is applicable to the switching elements (including the second abnormal voltage as one of the voltages) is lower than or equal to the value of the withstand voltage when the switching elements of the inverter is subjected to on/off control to cause the electric motor to perform the regenerative operation at the power generation output upper limit.

Note that in such a case, since the withstand voltage of the switching element decreases with decreasing temperature of the switching element, the power generation output upper limit can be basically set so as to satisfy the second condition by setting the power generation output upper limit so that the power generation output upper limit decreases with decreasing observation value of the temperature.

In this manner, even when a situation in which a high voltage, such as the second abnormal voltage, is applied to the switching element occurs, the power generation output upper limit during a regenerative operation performed by the electric motor can be set so that the magnitude of the voltage does not exceed the withstand voltage determined in accordance with the temperature of the switching element.

Thereafter, the power generation output limiting unit controls the power generation output of the electric motor so as to limit an actual power generation output during a regenerative operation performed by the electric motor to a value lower than or equal to the power generation output upper limit. In this manner, the voltage that is applicable to the switching element during the regenerative operation performed by the electric motor can be set to a value lower than or equal to the withstand voltage of the switching element.

In such a case, the power generation output upper limit can be set to as high a power generation output as possible among the power generation outputs in a range that satisfy the second condition. Accordingly, a temperature range (the temperature range of the switching element) in which the power generation output upper limit is set to a value that is lower than the highest power generation output of the electric motor defined in the specification of the electric motor control system can be minimized. In addition, in the other temperature range, the power generation output upper limit of the electric motor can be set to the highest power generation output or a value very close to the highest power generation output.

Thus, according to the fourth disclosure, the electric motor can be appropriately operated without a voltage applied to the switching element of the inverter exceeding the withstand voltage of the switching element while minimizing a limitation imposed on the rotational speed of the electric motor and a limitation imposed on the power generation output during a regenerative operation performed by the electric motor.

In the fourth disclosure, it is desirable that in order to satisfy the second condition, the power generation output upper limit setting unit set the power generation output upper limit in accordance with the observation value of the temperature indicated by the element temperature observation data so that a voltage applied to the switching elements when the switching elements of the inverter are subjected to on/off control to cause the electric motor to perform the regenerative operation at the power generation output upper limit and if electric power distribution between the DC power source and the inverter is interrupted is lower than or equal to the withstand voltage (a fifth disclosure).

At that time, the voltage applied to the switching elements when the switching elements of the inverter are subjected to on/off control to cause the electric motor to perform the regenerative operation at the power generation output upper limit and if electric power distribution between the DC power source and the inverter is interrupted corresponds to the second abnormal voltage that is applicable to the switching elements during a regenerative operation performed by the electric motor at the power generation output upper limit.

Thus, according to the fifth disclosure, the power generation output upper limit that satisfies the second condition can be appropriately set.

According to a second aspect of the present disclosure, an electric motor control system includes an inverter including a plurality of switching elements, where electric power is distributed between a DC power source and an electric motor via the inverter, an element temperature observation data acquiring unit that acquires element temperature observation data indicating an observation value of a temperature of the switching elements of the inverter, a power generation output upper limit setting unit that sets a power generation output upper limit during a regenerative operation performed by the electric motor in accordance with the observation value of the temperature indicated by the element temperature observation data, and a power generation output limiting unit that controls the power generation output of the electric motor so that an actual power generation output during the regenerative operation performed by the electric motor is lower than or equal to the power generation output upper limit. The power generation output upper limit setting unit sets the power generation output upper limit in accordance with the observation value of the temperature indicated by the element temperature observation data so as to satisfy, when each of the switching elements of the inverter is subjected to on/off control to cause the electric motor to perform a generative operation at the power generation output upper limit, a condition that a voltage applicable to the switching elements is lower than or equal to a withstand voltage of the switching elements, where the withstand voltage is determined in accordance with the observation value of a temperature indicated by the element temperature observation data on the basis of a predetermined relationship between the withstand voltage and a temperature of the switching elements, indicating that the withstand voltage increases with increasing temperature of the switching elements (a sixth disclosure).

According to the sixth disclosure, like the fourth disclosure, the power generation output upper limit setting unit sets the power generation output upper limit of the electric motor in accordance with the observation value of a temperature (the temperature of the switching elements of the inverter) indicated by the element temperature observation data.

As described above in the fourth disclosure, if a malfunction that interrupts power distribution between the DC power source and the inverter occurs during the regenerative operation performed by the electric motor, the second abnormal voltage may be applied to the switching elements immediately after the occurrence of the malfunction.

Thus, according to the sixth disclosure, like the fourth disclosure, the power generation output upper limit setting unit sets the power generation output upper limit in accordance with the observation value of the temperature indicated by the element temperature observation data so as to satisfy the second condition.

In this manner, even when a situation in which a high voltage, such as the second abnormal voltage, is applied to the switching elements occurs, the power generation output upper limit during a regenerative operation performed by the electric motor can be set so that the magnitude of the voltage does not exceed the withstand voltage determined in accordance with the temperature of the switching element.

Thereafter, like the fourth disclosure, the power generation output limiting unit controls the power generation output of the electric motor so as to limit an actual power generation output during a regenerative operation performed by the electric motor to a value lower than or equal to the power generation output upper limit. In this manner, the voltage that is applicable to the switching element during the regenerative operation performed by the electric motor can be set to a value lower than or equal to the withstand voltage of the switching element.

In addition, the power generation output upper limit can be set to as high a power generation output as possible among the power generation outputs in a range that satisfy the second condition. Accordingly, a temperature range (the temperature range of the switching element) in which the power generation output upper limit is set to a value that is lower than the highest power generation output of the electric motor defined in the specification of the electric motor control system can be minimized. Furthermore, in the other temperature range, the power generation output upper limit of the electric motor can be set to the highest power generation output or a value very close to the highest power generation output.

Thus, according to the sixth disclosure, the electric motor can be appropriately operated without a voltage applied to the switching element of the inverter exceeding the withstand voltage of the switching element while minimizing a limitation imposed on the performance of the electric motor (in particular, the power generation output during a regenerative operation).

In the sixth disclosure, it is desirable that in order to satisfy the above-described condition, the power generation output upper limit setting unit set the power generation output upper limit in accordance with the observation value of the temperature indicated by the element temperature observation data so that a voltage applied to the switching elements is lower than or equal to the withstand voltage when each of the switching elements of the inverter is subjected to on/off control so as to cause the electric motor to perform a regenerative operation at the power generation output upper limit and if distribution of the electric power between the DC power source and the inverter is interrupted (a seventh disclosure).

According to the seventh disclosure, like the fifth disclosure, the power generation output upper limit that satisfies the second condition can be appropriately set.

Obviously, numerous modifications and variations of the present invention are possible in light of the above teachings. It is therefore to be understood that within the scope of the appended claims, the invention may be practiced otherwise than as specifically described herein.

What is claimed is:

1. An electric motor control system comprising:
   an inverter including a plurality of switching elements, electric power being distributed between a DC power source and an electric motor via the inverter;
   an element temperature observation data acquiring unit that acquires element temperature observation data indicating an observation value of a temperature of the switching elements of the inverter;
   a rotational speed upper limit setting unit that sets a rotational speed upper limit of the electric motor in accordance with the observation value of the temperature indicated by the element temperature observation data; and
   a rotational speed limiting unit that controls the rotational speed of the electric motor so that an actual rotational speed of the electric motor is lower than or equal to the rotational speed upper limit,
   wherein the rotational speed upper limit setting unit sets the rotational speed upper limit in accordance with the observation value of a temperature indicated by the element temperature observation data so as to satisfy a first condition that a voltage applicable to the switching elements when the electric motor is operated at the rotational speed upper limit is lower than or equal to a withstand voltage of the switching elements, and
   wherein the withstand voltage is determined in accordance with the observation value of a temperature indicated by the element temperature observation data on the basis of a predetermined relationship between the withstand voltage and a temperature of the switching elements, indicating that the withstand voltage increases with increasing temperature of the switching elements.

2. The electric motor control system according to claim 1, further comprising:
   a magnet temperature observation data acquiring unit that acquires the magnet temperature observation data indicating an observation value of a temperature of the magnet mounted in the electric motor,
   wherein the rotational speed upper limit setting unit sets the rotational speed upper limit in accordance with the observation value of the temperature indicated by the element temperature observation data and the observation value of the temperature indicated by the magnet temperature observation data.

3. The electric motor control system according to claim 1, wherein in order to satisfy the first condition, the rotational speed upper limit setting unit sets the rotational speed upper limit in accordance with the observation value of the temperature indicated by the element temperature observation data so that a voltage applied to the switching elements due to an inductive voltage generated in the electric motor when the electric motor is operated at the rotational speed upper limit with any one of the switching elements of the inverter being turned off is lower than or equal to the withstand voltage.

4. The electric motor control system according to claim 1, further comprising:
   a power generation output upper limit setting unit that sets a power generation output upper limit during a regenerative operation performed by the electric motor in accordance with the observation value of the temperature indicated by the element temperature observation data; and
   a power generation output limiting unit that controls the power generation output of the electric motor so that an actual power generation output during a regenerative operation performed by the electric motor is limited to a value lower than or equal to the power generation output upper limit,
   wherein when each of the switching elements of the inverter is subjected to on/off control to cause the electric motor to perform a generative operation at the power generation output upper limit, the power generation output upper limit setting unit sets the power generation output upper limit in accordance with the observation value of the temperature indicated by the element temperature observation data so as to satisfy a second condition that a voltage applicable to the switching element is lower than or equal to the withstand voltage.

5. The electric motor control system according to claim 4, wherein in order to satisfy the second condition, the power generation output upper limit setting unit sets the power generation output upper limit in accordance with the observation value of the temperature indicated by the element temperature observation data so that a voltage applied to the switching elements when the switching elements of the inverter are subjected to on/off control to cause the electric motor to perform the regenerative operation at the power generation output upper limit and if distribution of electric power between the DC power source and the inverter is interrupted is lower than or equal to the withstand voltage.

6. An electric motor control system comprising:
   an inverter including a plurality of switching elements, electric power being distributed between a DC power source and an electric motor via the inverter;
   an element temperature observation data acquiring unit that acquires element temperature observation data indicating an observation value of a temperature of the switching elements of the inverter;

a power generation output upper limit setting unit that sets a power generation output upper limit during a regenerative operation performed by the electric motor in accordance with the observation value of the temperature indicated by the element temperature observation data; and a power generation output limiting unit that controls the power generation output of the electric motor so that an actual power generation output during the regenerative operation performed by the electric motor is lower than or equal to the power generation output upper limit, wherein the power generation output upper limit setting unit sets the power generation output upper limit in accordance with the observation value of the temperature indicated by the element temperature observation data so as to satisfy, when each of the switching elements of the inverter is subjected to on/off control to cause the electric motor to perform a generative operation at the power generation output upper limit, a condition that a voltage applicable to the switching elements is lower than or equal to a withstand voltage of the switching elements, and wherein the withstand voltage is determined in accordance with the observation value of a temperature indicated by the element temperature observation data on the basis of a predetermined relationship between the withstand voltage and a temperature of the switching elements, indicating that the withstand voltage increases with increasing temperature of the switching elements.

7. The electric motor control system according to claim 6, wherein in order to satisfy the condition, the power generation output upper limit setting unit sets the power generation output upper limit in accordance with the observation value of the temperature indicated by the element temperature observation data so that a voltage applied to the switching elements is lower than or equal to the withstand voltage when each of the switching elements of the inverter is subjected to on/off control so as to cause the electric motor to perform a regenerative operation at the power generation output upper limit and if distribution of the electric power between the DC power source and the inverter is interrupted.

8. An electric motor control system comprising:
an inverter including switching elements, electric power being to be distributed between a DC power source and an electric motor via the inverter;
an element temperature observation data acquiring device configured to acquire element temperature observation data indicating an observation value of a temperature of the switching elements of the inverter;
a rotational speed upper limit setting device configured to set a rotational speed upper limit of the electric motor in accordance with the observation value of the temperature of the switching elements so as to satisfy a first condition that a voltage applicable to the switching elements in a case where the electric motor is operated at the rotational speed upper limit is lower than or equal to a withstand voltage of the switching elements, the withstand voltage being determined in accordance with the observation value of the temperature of the switching elements based on a predetermined relationship between the withstand voltage and a temperature of the switching elements indicating that the withstand voltage increases as the temperature of the switching elements increases; and a rotational speed limiter configured to control the electric motor so that a rotational speed of the electric motor is lower than or equal to the rotational speed upper limit.

9. The electric motor control system according to claim 8, further comprising:
a magnet temperature observation data acquiring device configured to acquire magnet temperature observation data indicating an observation value of a temperature of a magnet mounted in the electric motor,
wherein the rotational speed upper limit setting device sets the rotational speed upper limit in accordance with the observation value of the temperature of the switching elements and the observation value of the temperature of the magnet.

10. The electric motor control system according to claim 8,
wherein in order to satisfy the first condition, the rotational speed upper limit setting device sets the rotational speed upper limit in accordance with the observation value of the temperature of the switching elements so that a voltage applied to the switching elements due to an inductive voltage generated in the electric motor in a case where the electric motor is operated at the rotational speed upper limit with any one of the switching elements of the inverter being turned off is lower than or equal to the withstand voltage.

11. The electric motor control system according to claim 8, further comprising:
a power generation output upper limit setting device configured to set a power generation output upper limit during a regenerative operation performed using the electric motor in accordance with the observation value of the temperature of the switching elements; and
a power generation output limiting device configured to control the electric motor to limit a power generation output from the electric motor during the regenerative operation to a value lower than or equal to the power generation output upper limit,
wherein in a case where each of the switching elements of the inverter is subjected to on/off control to control the electric motor to perform the regenerative operation at the power generation output upper limit, the power generation output upper limit setting device sets the power generation output upper limit in accordance with the observation value of the temperature of the switching elements so as to satisfy a second condition that a voltage applicable to the switching elements is lower than or equal to the withstand voltage.

12. The electric motor control system according to claim 11,
wherein in order to satisfy the second condition, the power generation output upper limit setting device sets the power generation output upper limit in accordance with the observation value of the temperature of the switching elements so that a voltage applied to the switching elements in a case where the switching elements of the inverter are subjected to on/off control to control the electric motor to perform the regenerative operation at the power generation output upper limit and if distribution of electric power between the DC power source and the inverter is interrupted is lower than or equal to the withstand voltage.

13. The electric motor control system according to claim 8, further comprising:
a power generation output upper limit setting device configured to set a power generation output upper limit of the electric motor during a regenerative operation performed using the electric motor in accordance with the observation value of the temperature of the switching elements so as to satisfy a third condition that a voltage applicable to the switching elements is lower than or equal to the withstand voltage of the switching elements in a case where each of the switching elements of the inverter is subjected to on/off control to control the electric motor to perform the regenerative operation at the power generation output upper limit, the withstand voltage being determined in accordance with the observation value of the temperature of the switching elements based on the predetermined relationship between the withstand voltage and a temperature of the switching elements indicating that the withstand voltage increases as the temperature of the switching elements increases; and a power generation output limiting device configured to control the electric motor so that a power generation output from the electric motor during the regenerative operation is lower than or equal to the power generation output upper limit.

14. The electric motor control system according to claim 13, wherein in order to satisfy the condition, the power generation output upper limit setting device sets the power generation output upper limit in accordance with the observation value of the temperature of the switching elements so that a voltage applied to the switching elements is lower than or equal to the withstand voltage in a case where each of the switching elements of the inverter is subjected to on/off control so as to control the electric motor to perform the regenerative operation at the power generation output upper limit and if distribution of the electric power between the DC power source and the inverter is interrupted.

15. The electric motor control system according to claim 8, wherein if the observation value of the temperature of the switching elements is higher than or equal to a predetermined temperature, the rotational speed upper limit setting device sets the rotational speed upper limit to a highest rotational speed of the electric motor.

16. The electric motor control system according to claim 13, wherein if the observation value of the temperature of the switching elements is higher than or equal to a predetermined temperature, the power generation output upper limit setting device sets the power generation output upper limit to a highest power generation output of the electric motor.

* * * * *